United States Patent
Greenspan et al.

(10) Patent No.: US 7,123,895 B2
(45) Date of Patent: Oct. 17, 2006

(54) METHOD AND SYSTEM FOR IMPLEMENTING A COMMUNICATIONS TRANSCEIVER USING MODIFIED GPS USER EQUIPMENT

(75) Inventors: Richard L. Greenspan, Newton Centre, MA (US); Joseph M. Przyjemski, Shirley, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 421 days.

(21) Appl. No.: 10/395,941

(22) Filed: Mar. 24, 2003

(65) Prior Publication Data

US 2004/0002331 A1 Jan. 1, 2004

Related U.S. Application Data

(60) Provisional application No. 60/392,495, filed on Jun. 28, 2002.

(51) Int. Cl.
*H04B 1/10* (2006.01)
(52) U.S. Cl. ............... 455/311; 342/357.12; 342/357.1
(58) Field of Classification Search ............... 455/3.01, 455/3.05, 85–87, 232.1, 550.1, 311, 323, 455/84, 556.1; 342/357.1, 357.17, 357.12
See application file for complete search history.

(56) References Cited

U.S. PATENT DOCUMENTS

| | | | |
|---|---|---|---|
| 6,069,584 A * | 5/2000 | Johnson | 342/357.09 |
| 6,542,113 B1 | 4/2003 | Fujii | 342/357.02 |
| 6,608,589 B1 | 8/2003 | Devereux et al. | 342/357.06 |
| 6,785,543 B1 | 8/2004 | Karabinis | 455/427 |
| 6,785,757 B1 | 8/2004 | Hatsumoto | 710/305 |

* cited by examiner

*Primary Examiner*—Edward F. Urban
*Assistant Examiner*—Tu X. Nugyen
(74) *Attorney, Agent, or Firm*—Mark G. Lappin; Greenberg Traurig LLP

(57) ABSTRACT

A communications transceiver is implemented by modifying a GPS user equipment. In a data reception mode, a communications signal that has a carrier frequency outside the L-band, and that has been phase modulated by a PN code and by data encoded therein, is received from a conventional L-band GPS antenna. The signal is downconverted to the L-band input frequency of the GPS transceiver, and subjected to automatic gain control. The GPS transceiver software is modified so as to recognize and replicate the PN code, and to demodulate the data-bearing signal. In the data transmission mode, the data to be transmitted are modulated onto the selected PN code sequence. The data-modulated PN signal is converted to a non L-band transmission frequency. Normal operation of the GPS transceiver navigation functions is maintained in parallel with the communications functions.

20 Claims, 4 Drawing Sheets

Elevation Coverage @ 9.84 GHz:

METHOD AND SYSTEM FOR IMPLEMENTING A COMMUNICATIONS TRANSCEIVER USING MODIFIED GPS USER EQUIPMENT

CROSS REFERENCES TO RELATED APPLICATIONS

This application claims the benefit of priority under 35 U.S.C. §119(e) from co-pending, commonly owned U.S. provisional patent application Ser. No. 60/392,495, entitled "Communications Transceiver Using Modified GPS User Equipment," and filed on Jun. 28, 2002.

FIELD OF THE INVENTION

The present invention relates generally to information transmission, and more particularly to a communication transceiver realized using modified GPS user equipment.

BACKGROUND

Information transmission by means of radio wave propagation has become ubiquitous since Marconi's demonstration of radio-telegraphy in the early 1900's. Until the early 1960's, information was generally transmitted over radio communications circuits by means of analog modulation of a carrier frequency. Transmission of digital data evolved from the late 1950's onwards, in the beginning to support the development of military communications equipment. Digital data transmission was initially motivated by Claude Shannon's seminal investigations of channel capacity. Since then, this technology has been applied to support widespread commercial use. In all of these applications, the means to provide two-way communications require both the sender and the receiver to be equipped with a combination of radio transmitting and receiving equipment, i.e. with a transceiver.

Currently, any person who operates the Global Positioning System (GPS) user equipment must provide a separate communications transceiver, in order to conduct two-way communications of data messages while using GPS equipment for navigational purposes. As well known, the GPS is a network of at least 24 NAVSTAR satellites, which orbit the earth at an altitude of about 11,000 miles. GPS user equipment can locate the position of a user anywhere on earth by very accurately measuring the distance between the user and at least four GPS satellites. The GPS satellites provide specially coded signals that are processed in a GPS receiver, enabling that receiver to generate the user's position, velocity and time by computing the relative transit times of signals transmitted simultaneously from a multiplicity of the GPS satellites. In this way, the GPS provides precise positioning and timing data, which are useful for a variety of applications, including, but not limited to, navigation, surveillance, mapping, and vehicle tracking.

At present, however, an operator of GPS equipment must procure a separate and independent radio communications system in order to engage in two-way radio communications. The operator must thus bear the significantly increased cost, volume, weight and power consumption associated with providing separate and independent radio communications systems.

Accordingly, it is desirable to provide a more efficient and inexpensive method and system for enabling two-way (bi-directional) radio communications of data between two or more users who operate GPS navigation user equipment. In particular, it is desirable to provide both communication and GPS navigation services within a single GPS transceiver. In this way, the cost, volume, weight, and power consumption that are necessary in order to provide both communications and navigation services can be significantly reduced.

SUMMARY OF THE INVENTION

The present invention provides a method and system for implementing a radio communications transceiver for two-way data messaging within a GPS transceiver, by making minor modifications to existing GPS user equipment. Using the method and system of the present invention, the GPS user equipment is operable to function simultaneously as a communications transceiver, as well as a source of precise positioning information, with minimal impact on existing hardware and software of the GPS user equipment.

A system is presented that integrates within a single user equipment both navigation and data communication functionalities. A system in accordance with a preferred embodiment of the present invention includes a GPS transceiver connected to a conventional L-band GPS antenna for intercepting at least one communications signal, in addition to the GPS navigation signals that occupy their assigned L-band frequencies. The communications signal is encoded to emulate a GPS satellite signal, and is modulated onto a carrier frequency outside the L-band frequencies assigned to satellite-based radio-navigation services. In particular, the communications signal is encoded with a PN (pseudorandom number) code that is one of the unused spare PN codes available to the GPS satellites. The user's GPS antenna has been shown by the inventors of the present application to have enough gain at a plurality of selected communications frequencies to maintain a signal-to-noise ratio at the receiver input to the GPS transceiver that is adequate to support high quality data demodulation. The GPS transceiver contains software that is modified to allow the transceiver to recognize and replicate the communications signal PN code and to extract the underlying modulated data.

The system further includes a downconverter for downconverting the carrier frequency of the communications signal to the radio frequency (RF) input frequency of the GPS transceiver, and an AGC (automatic gain control) circuit for controlling the amplitude of the downconverted communications signal so that the power level of the communications signal does not overload the receiver input to the GPS transceiver. By subjecting the communications signal to gain control ahead of the receiver input, interference between the communications signal and the L-band GPS signals broadcast by the GPS satellites is prevented.

The GPS transceiver includes means for modulating the data to be communicated onto the selected PN code generated within. In the present invention, the informational content of the data is constrained solely by the bandwidth of the PN code set. The means for modulating the data include means for preparing data for modulation onto the RF carrier. The means for preparing data for modulation include a receiver clock, a data source, and a code generator for generating the selected PN code. Using the receiver clock and the code generator, a properly time synchronized copy of the selected PN code can be generated. The means for modulating data further include a phase modulator for performing binary phase modulation of the data onto the PN code selected to transmit the communications signal.

The GPS transceiver includes means for translating the data-modulated base-band communications signal onto an RF carrier for transmission. The means for RF translation includes a frequency converter and a frequency synthesizer that generate the conversion frequencies. A filter for filtering the RF communications signal and an amplifier for amplifying the RF communications signal may also be included.

The GPS transceiver further includes means for frequency translation and demodulation. The means for frequency translation and demodulation can process an incoming communications signal that has a carrier frequency outside the GPS L-band frequencies and that contains data encoded thereon, so as to extract the data content from the encoded communications signal. The means for frequency translation and demodulation includes an RF/IF converter, and the pre-existing receiver clock, code generator, and correlator within the GPS transceiver. The receiver clock and the code generator include software that is modified so as to enable the receiver clock and the code generator to recognize and acquire the PN code of the communications signal, through correlation with a stored replica of that PN code.

A method is presented for implementing a communications transceiver using GPS user equipment having a GPS transceiver connected to a GPS antenna. The method for transmitting and receiving data includes re-utilizing the GPS antenna to intercept at least one communications signal, which is encoded with a spare GPS PN code, and has a carrier frequency outside the L-band frequencies allocated for use by GPS navigation signals. The method for receiving data includes downconverting the carrier frequency of the communications signal to an RF input frequency of the GPS receiver. The method for receiving data includes adding an automatic gain control circuit to the RF/IF conversion path from the GPS antenna to the GPS transceiver, in order to control the amplitude of the downconverted communications signal to a level within the power reception capacity of the transceiver, and to avoid interference between the communications signal and the L-band GPS navigation signals.

The method for transmitting data includes modulating data onto the PN code signal, and converting the data-modulated PN code signal into an RF band for transmission from the GPS antenna. The method includes modifying the software within the GPS transceiver, so as to enable the GPS transceiver to recognize and replicate the PN code that has been allocated to support communications. The step of converting the data-modulated communications signal into an RF signal is performed using one or more conversion frequencies that are generated by a receiver clock and a frequency synthesizer in the GPS transceiver.

BRIEF DESCRIPTION OF THE DRAWINGS

So that the manner in which the above recited features of the present invention are attained can be understood in detail, a more particular description of the invention, briefly summarized above, may be had by reference to the embodiments thereof which are illustrated in the appended drawings. The drawing figures depict preferred embodiments by way of example, not by way of limitations. In the figures, like reference numerals refer to the same or similar elements.

DETAILED DESCRIPTION OF THE PREFERRED EMBODIMENTS

The present invention is directed to a method and system for implementing two-way radio communications of data between a plurality of users of GPS equipment, by making minimal modifications to existing GPS user equipment. In the present invention, standard GPS user equipment is modified so as to allow the GPS equipment to operate simultaneously as a communications transceiver, as well as in its original role as a source of precise positioning information. In this way, users can avoid the significantly increased cost, volume, weight, and power consumption that are required in order to construct and implement a separate secure radio communications system.

Figure 1:
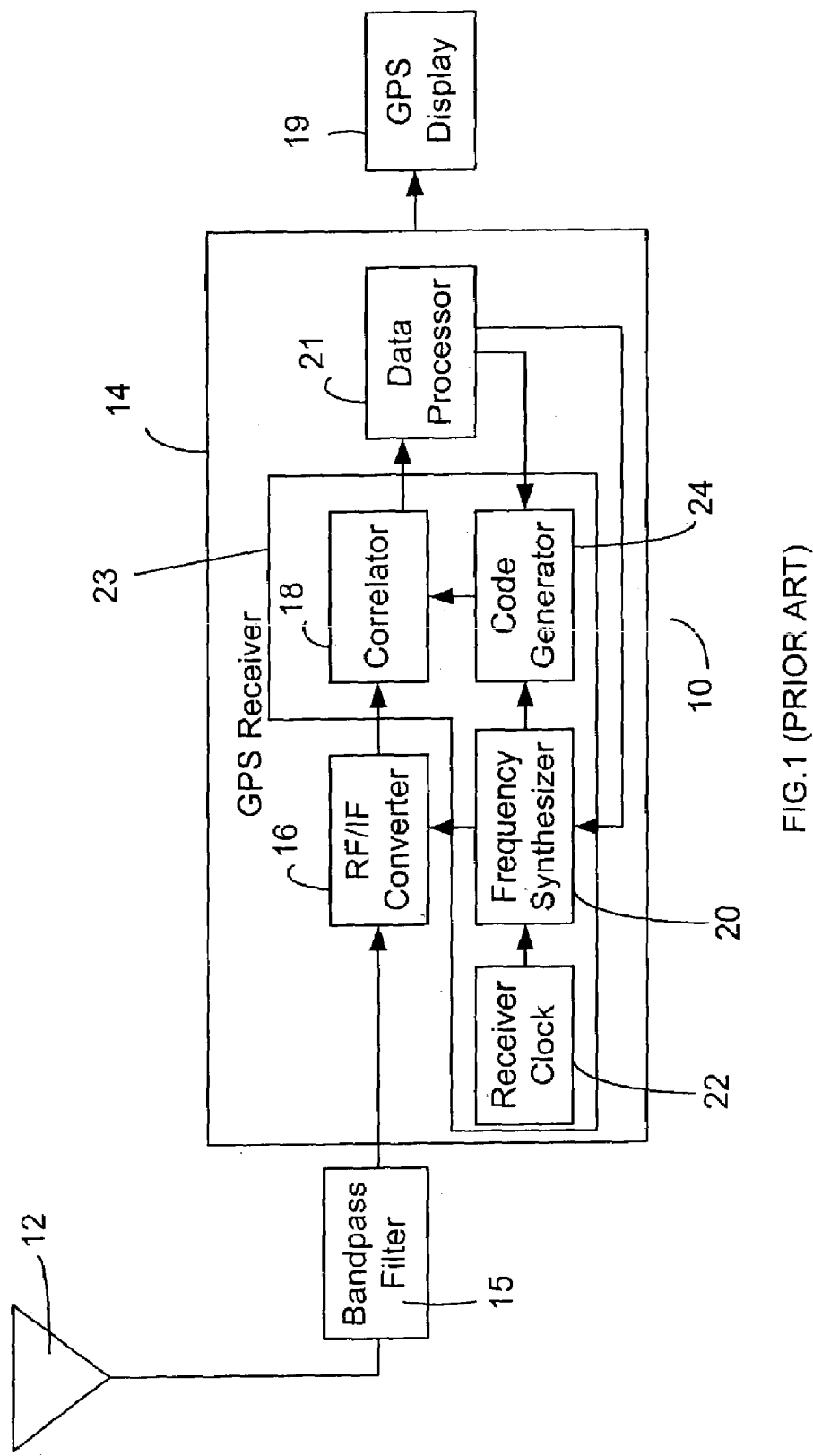
FIG. 1 is a schematic block diagram of a conventional GPS receiver, as known in the art.

FIG. 1 is a schematic block diagram of a conventional, prior art GPS user equipment 10. The GPS user equipment 10 includes a GPS antenna 12 connected to a GPS receiver 14. The antenna 12 may be connected to the receiver 14 by a coaxial cable. Other components of conventional GPS user equipment may include a display 19, a bandpass pre-selection filter 15 and a regulated dc-power supply (not shown). As known in the art, the GPS receiver can locate the user's position from range measurements to a number of satellites in the GPS satellite constellation. GPS satellites transmit two L-band radio ranging signals, designated L1 and L2. PN code timing and carrier frequencies for both signals are generated from a standard frequency of 10.23 MHz, which is the fundamental satellite clock frequency. The L1 carrier has a frequency of 1575.42 MHz, and the L2 carrier has a frequency of 1227.60 MHz.

The GPS encodes ranging signals and supporting data by means of a Code Division Multiple Access (CDMA) L-band carrier signal. As known in the art, in CDMA the carrier phase of the transmitted signal is made to vary according to a defined pattern or code, in such a way that the signal can be recovered only by a receiver that is programmed with the same code. Each GPS satellite broadcasts a signal encoded with a digital PN code sequence, which is unique to the satellite and which is also known by the GPS receiver. On reception, each carrier can be distinguished from the others by the carrier's PN modulation code. Code-division multiplexing thus enables signals from multiple satellites to occupy the same frequency band, while preserving the ability of the GPS user equipment to receive each satellite signal with a negligible amount of interference from the other satellite signals. Since each PN code corresponds to a different navigation channel, multiple channels can be independently coded for transmission over a single wideband channel. The GPS signals are isolated from each other by these underlying PN codes, which, when decoded, restore the original desired navigation or communications signal, while removing the effect of other coded signals.

Two types of binary codes are modulated onto the GPS L1 and L2 signals: the C/A ("coarse acquisition") code and the P ("precise") code. The L1 signal is modulated by both the C/A code and the P code, in such a way that the two codes do not interfere with each other. The C/A codes are available for civilian applications, and have a binary phase-reversal or "chipping" rate of 1.023 MHz. The complete C/A code pattern repeats itself at 1 millisecond intervals during which time the radio signals travel 300 km en-route from the satellite to the receiver. The P code, or precise code, is a segment of much longer binary code whose "chipping rate" is 10.23 MHz and that repeats every 38 weeks. The P code is generally reserved for military uses. For use by operational satellites the P code is segmented into 38 individual segments that are repeated at one week intervals where each satellite transmits a different weekly section of the code.

These PN ranging codes are modulated by supporting data at a rate of 50 bits/second. This supporting data message provides the GPS users with information about satellite orbits, satellite health, and miscellaneous other parameters that are required to properly derive a navigation solution from the received signals. The codes are modulated onto the carrier waves using binary phase modulation, in which the transmitted signal is varied over a much wider frequency band, as compared to the minimum bandwidth required to transmit the information that is being sent. Spread spectrum modulation helps to mitigate radio frequency interference from natural noise sources or from intentional signal jamming. In a military application the bandwidth of the transmitted PN code is approximately 200,000 times larger than the information bandwidth. This bandwidth expansion feature is exploited by the receiver to maintain reception of the satellite signals in the presence of intentional or unintentional radio frequency interference (RFI).

A conventional GPS receiver 14, illustrated in FIG. 1, processes the L-band signals transmitted from a multiplicity of GPS satellites, in order to determine the user's position, velocity, and time. In particular, the GPS receiver 14 is designed to decode the L-band signals so that the code and carrier information for each particular satellite can be extracted. As seen from FIG. 1, the prior art GPS receiver 14 includes an RF/IF converter 16, a demodulating circuit 23, and a data processor 21. The demodulating circuit 23 demodulates the communications signal, so that data can be extracted therefrom. The demodulating circuit 23 includes a correlator 18, a frequency synthesizer 20, a receiver clock 22, and a code generator 24. The data processor 21 processes the data extracted from the demodulated GPS signals, and sends the processed data to the GPS display unit 19.

A GPS navigation signal received from the GPS antenna 12 is passed through a bandpass filter 15, which rejects all parts of the signal that are not within the L1 bandwidth. The result is a filtered RF signal. The RF/IF converter 16 converts the filtered RF signal into an IF (intermediate frequency) signal, which is typically digitally sampled prior to extraction of timing, carrier frequency offset, and carrier phase information by the GPS receiver's signal processing units. In order to compute the position of the GPS user, the GPS receiver 14 computes the time delays measured between the received signal from each satellite and the receiver clock 22. To compute these time delays, the correlator 18 performs a correlation process. By sequentially adjusting the relative timing of the stored replica of the PN code relative to the received signal, and observing the correlation output, the receiver determines the time delay between the received signal and a local clock.

A limited number of unused pseudo-random codes are available within the satellites and in the GPS user equipment. The present invention is predicated in part upon the recognition that it is conceptually possible to allocate one of these spare codes for other than satellite-based navigation, and in particular, for purposes of transmitting data messages unrelated to GPS navigation. This purpose is distinct from the well-known efforts to broadcast GPS-like L-band navigation signals from airborne or terrestrial "pseudolites" (pseudo-satellites).

A feature of this alternative communications use is that it can avoid a problem caused by the transmission of high power L-band pseudolites, for which the pseudolite signal may, in fact, cause interference to the weak satellite signals at the GPS receiver, thereby disrupting the navigation function. This problem is often referred to as the "near-far" problem, which arises because of the variation in the user-to-pseudolite distance. While the average power received from the GPS satellites remains approximately constant, due to the large distance of the satellites from the users, pseudolite power varies a great deal, being inversely proportional to the square of the user's distance from the pseudolite. As a user approaches a pseudolite these signals can overwhelm or jam incoming GPS satellite signals.

The present invention proposes to overcome the above-described problem, namely potential interference caused by a high-powered L-band pseudolite signal, by a combination of: 1) selecting the carrier frequency at other than an L-band frequency allocated to GPS; and 2) adding gain control in the RF/IF conversion path from the receiver antenna to the receiver processor. In particular, it is shown that a separate antenna is not necessary for purposes of integrating communications and navigation functions into a single unit, and that a conventional GPS antenna can be used to receive data-bearing pseudolite-like signals that have a carrier frequency substantially higher than L-band GPS frequencies. This distinguishes the current invention from other systems that combine GPS navigational functions with communication functions in which the communications signals are constrained to operate in the Mobile-Satellite Service (MSS) or other nearby frequency bands.

Figure 2:
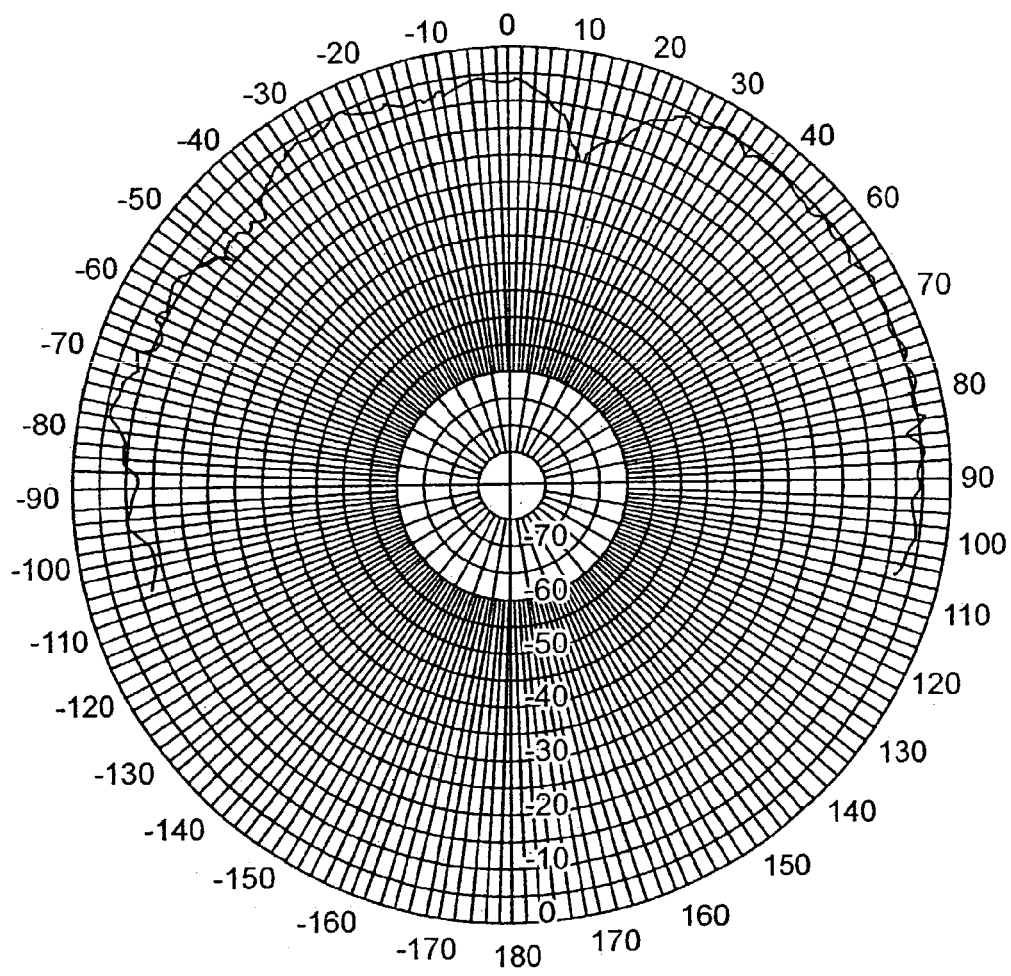
FIG. 2 illustrates the frequency response test results of a GPS antenna that demonstrate the feasibility of using the GPS antenna to provide reception and transmission of communications signals at other than the L1/L2 frequency coverage allocated to GPS navigation signals.

FIG. 2 illustrates one representative of a multiplicity of antenna pattern frequency response test results, which demonstrate that the conventional GPS antenna 12 can be used to provide non-L1/L2 coverage. While GPS antennas are generally thought of as being specific to narrow frequency bands, the results of measurements as shown in FIG. 2 show that the antenna 12 has multiple resonances at frequencies that are not necessarily predictable, not even being harmonically related. The illustrated test results at 9.84 GHz show that a GPS antenna provides good coverage and response in elevation and azimuth not only at the L1/L2 resonances, but at significantly offset frequencies. Therefore, the GPS antenna 12 can be shared by a communications data link, by way of example, while simultaneously providing GPS navigation services.

Accordingly, the present invention features the re-use of the GPS antenna 12 to intercept a communications signal having a carrier frequency outside the L-band. Re-using the GPS antenna 12 to transmit and receive data signals at other than L-band frequencies significantly lowers the cost, volume, weight, and power consumption, as compared to systems that use a separate antenna for receiving and transmitting data signals. In military applications, using a common antenna for both GPS satellite signals, and for certain higher frequency signals, eliminates the need for a more complex dual-band antenna and, in particular, for the addition of a separate antenna dedicated to a data link. The need to incur a costly modification to an airframe to install a new antenna is also avoided.

The method and system of the present invention provides the user with the flexibility of operating in one or more frequency bands that are assigned to military or other governmental purposes. Such frequency bands may include, for example, the S-band, C-band, and the X-band spectra. The antenna 12 is generally omni-directional.

Further, the approach of the present invention avoids the unlicensed use of L-band frequencies for communications purposes using frequencies that have already been allocated by international treaty to satellite-based radio-navigation services. For example, these treaties prevent users of mobile communications equipment from encroaching upon the frequency spectrum that is reserved for navigation purposes. By selecting a different carrier frequency for the reception and transmission of communication data, the method and system of the present invention permits a user to operate in frequency bands that are assigned to military or other communications purposes, without interference from other users, and without the need to infringe upon the GPS-assigned frequencies for unlicensed communications purposes.

Figure 3:
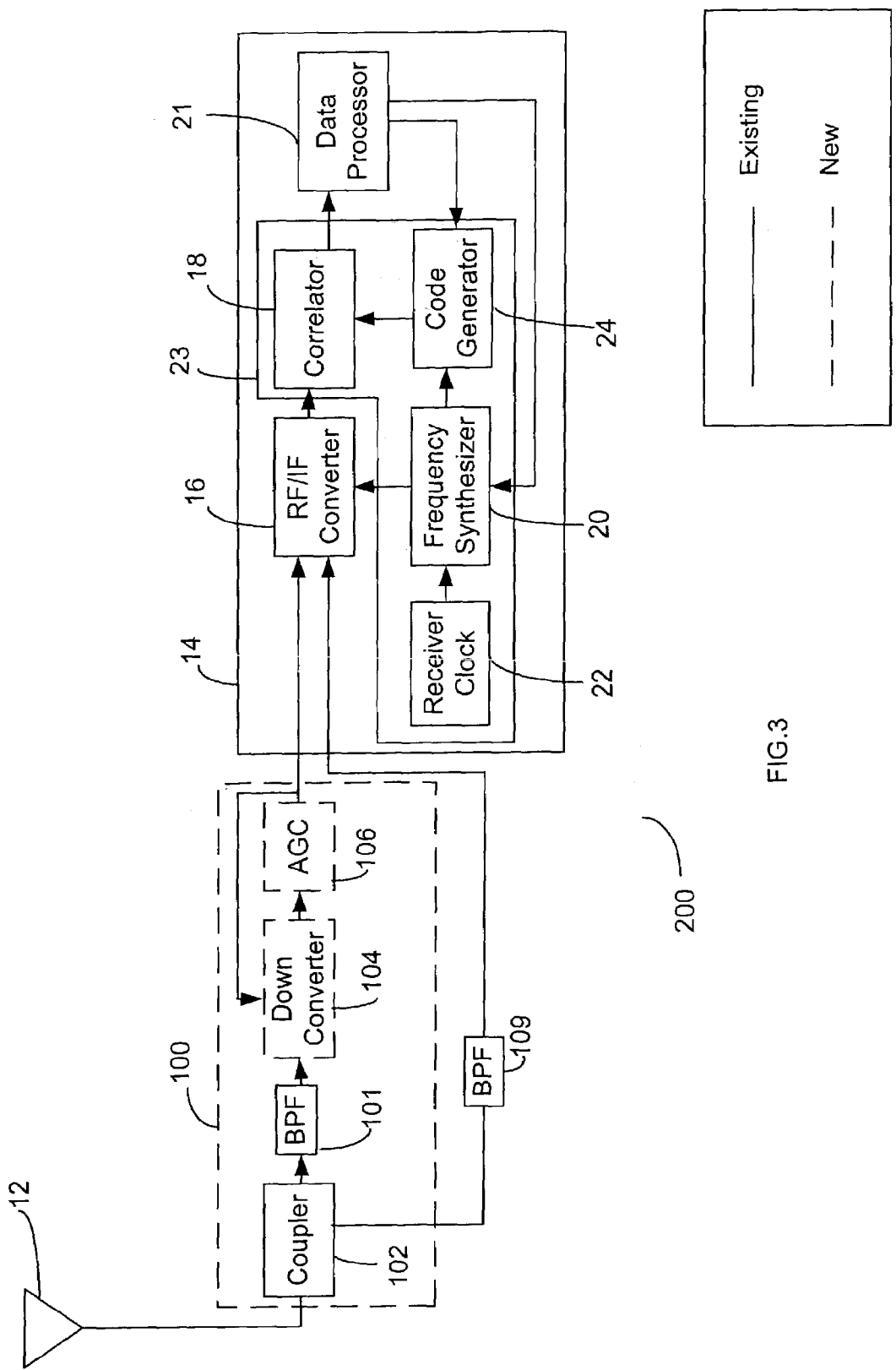
FIG. 3 is a functional block diagram illustrating the receiver portion of a communications transceiver implemented by modifying GPS user equipment.

FIG. 3 is a functional block diagram illustrating the receiver mode of a communications transceiver 200, which is implemented using modified GPS user equipment, in accordance with one embodiment of the present invention. In the embodiment illustrated in FIG. 3, the present invention features a subunit 100, which is added to a standard GPS receiver 14 in order to enable the receiver 14 to receive a communications signal having a carrier frequency outside the L-band. The subunit 100 includes a power coupler 102, a bandpass filter (BPF) 101, a downconverter 104, and an AGC circuit 106. In FIG. 3, the new features added in order to implement the method and system of the present invention are illustrated using dashed lines, whereas standard components of prior art GPS equipment are illustrated using solid lines. Typically, the hardware of the sub-unit 100 can be fitted within an integrated chip having dimensions of a few millimeters per side.

In the illustrated embodiment, parallel paths are provided from the GPS antenna 12 to the GPS receiver 14, the first path consisting of the bandpass filter 109, and the second path consisting of the subunit 100. Both the L-band signals transmitted by GPS satellites, as well as one or more communications signals having a higher carrier frequency outside the L-band, are received by the GPS antenna 12, and flow through the coupler 102. As seen from FIG. 3, the bandpass filter for GPS signals 109 is a standard component of prior art GPS receivers, whereas the bandpass filter 101, the downconverter 104 and the AGC circuit 106 are added to sub-unit 100 in order to implement a method and system in accordance with the illustrated embodiment of the present invention. The bandpass filter 109 rejects all parts of the incoming signal that are not within the L1 or the L2 bandwidth. Therefore, only the GPS L-band signals emerge from the output of the bandpass filter 109, from which they are input into the GPS receiver 14.

A combination of the GPS L-band signals and the higher frequency communications signal also go through the coupler 102 but only the communications signal passes through BPF 101 and the downconverter 104. As a result, only the down-converted communications signal flows from subunit 100, from which it is routed to the GPS receiver 14. The downconverter 104 downconverts the frequency of the incoming signals into the L-band input frequency of the GPS receiver 14. The downconverted signal also passes through the AGC circuit 106. The signal that emerges from the subunit 100 is a data bearing PN coded signal, having been brought down to an input frequency of the GPS receiver.

By subjecting the communications signal to gain control, its amplitude is controlled to a level that will not interfere with, or overload the reception capabilities of the GPS receiver 14. The power of a GPS satellite signal is fairly weak. Therefore, if the frequency converted communications signal is provided to the GPS receiver without undergoing gain control, the receiver's ability to discriminate between the communications signal and the GPS satellite signal is diminished, thus causing interference to the navigation function of the GPS.

The communications signal that enters the receiver 14 contains communications data modulated thereon. In the present invention, the software in the GPS receiver 14 is modified, so as to enable the receiver 14 to recognize the PN code of the communications signal, and to demodulate the data content in the signal. The downconverted and gain-controlled communications signal is routed to an RF/IF converter 16, found in standard GPS receivers, as illustrated in FIG. 1. The RF/IF converter 16 translates the signal into a suitable intermediate frequency for further processing. The output of the converter 16 is coupled to a demodulating circuit 23 and a data processor 21, both of which are disposed in the GPS receiver 14. The demodulating circuit 23 together with the data processor 21 demodulates the communications signal in order to extract data from the communications signal.

The demodulating circuit 23 in a standard GPS receiver 14 includes a code generator 24, a correlator 18, a frequency synthesizer 20, and a receiver clock 22, all of which are illustrated in FIG. 1. Typically, a digital demodulating circuit is implemented. In this case, the IF signal is passed through an analog to digital (A/D) converter (not shown), which digitizes the output signals from the RF to IF converter 16. To decode the communications signal and extract the data content therefrom, the IF signal is "de-spread", i.e. the signal's PN code is removed therefrom by correlation with a stored replica of the PN code generated by the code generator 24 and demodulated by the data processor 21. The replica of the PN code is generated by a numerically controlled oscillator in the code generator 24. The correlator 18 correlates this replica with the noisy IF signal. During the correlation process, the correlator 18 multiplies the received signal by the replica of the PN code, and integrates or lowpass filters the product, in order to prepare the communications signal for data demodulation.

The GPS receiver 14 includes software modifications that enable it to recognize and replicate the communications signal's PN code, as well as the PN codes that distinguish each satellite transmission. As mentioned earlier, the communications signal's PN code is one of the unused satellite codes that is not reserved for use by an operational satellite. The spare PN code is a one week segment of the 38-week P-code. In the present invention, it is suggested that a one-week segment of the satellite P code can actually support more than 300 code segments of half-hour duration that are time shifted by multiples of one half hour of the spare code with negligible interference among them, i.e. the one week segment could support hundreds of essentially independent codes, based on half-hour intervals of a repeat sequence. The software modification includes obtaining a requisite delay offset for generating the spare PN code segments, which amounts to providing a proper initialization sequence into one of two shift registers, at the time the code generator initiates its code sequence. By starting one of the shift registers with different initial conditions, a unique code sequence is obtained, which is a shifted version of a basic signal. The shift is large enough, so that two codes separated by a half hour in effective time do not interfere with each other. The object of this approach is to permit many users to share the communications channel.

Figure 4:
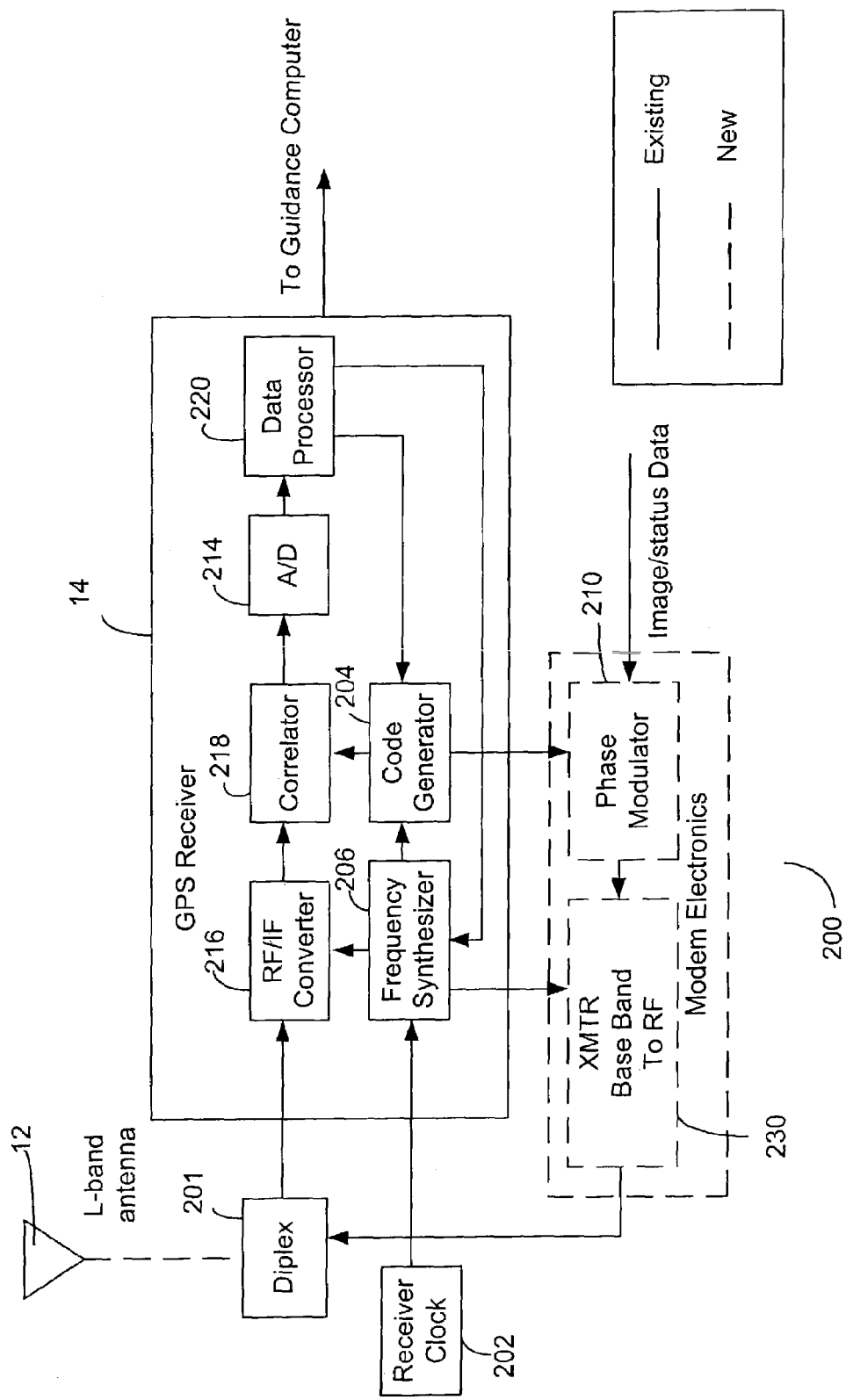
FIG. 4 is a functional block diagram illustrating the transmitter portion of a communications transceiver implemented by modifying GPS user equipment.

FIG. 4 is a functional block diagram illustrating a transmitter mode implementation of a communications transceiver 200 using modified GPS user equipment. In a transmitting stage, the transceiver 200 provides means to modulate a spare PN code with the data sequence to be transmitted. The data modulated code is then translated to the RF transmission frequency. The translation to RF can be mechanized by the addition of frequency conversion, filtering, and amplification stages. By analogy to FIG. 3, standard GPS components, known in the prior art, are illustrated using solid lines, whereas the new components provided by the method and system of the present invention are shown in dashed lines.

As seen from FIG. 4, a diplexer 201 provides for the simultaneous reception of GPS signals, and transmission of a higher-frequency signal. A receiver clock 202, a code generator 204, and a frequency synthesizer 206 in the GPS receiver 14 are used in the present invention by the transceiver 200. As in prior art GPS receivers illustrated in FIG. 1, the receiver 14 includes an RF/IF converter 216, a correlator 218 for correlating incoming navigation and communications signals with locally stored replicas of the PN codes, an analog-to-digital converter 214 for digitizing the output of the correlator 218, and a data processor 220 for processing the data content of the communications signals, as well as the GPS navigation signals. The data to be transmitted are modulated on to the communications PN code in the phase modulator 210. Modulation is generally of a digital type, such as phase shift keying. In the illustrated embodiment, the phase modulator 210 performs binary phase shift modulation.

The frequency synthesizer 206 in the GPS receiver 14 synthesizes the communications signal's carrier frequency, and other related frequencies, from a standard reference oscillator. The PN codes generated within the receiver 14 are clocked by these related frequencies. A baseband data modulator 210 that modulates data onto the PN code sequences can be mechanized by baseband digital signal processes for data rates up to 10 Mb/sec. However, the reception of these modulated signals must recognize the trade off between data rate and signal-to-noise ratio. An increase in data rate requires a corresponding increase in signal-to-noise ratio in order to maintain the minimum level of signal-to-noise ratio per data bit required for reliable bit detection.

The data-modulated communications signal is translated into RF for transmission, by a translator unit 230. In the present invention, the transmitter frequencies are non-GPS related, i.e. are transmitted at other than an L-band carrier frequency. The carrier frequency is selected by a combination of factors, including available ITU frequency allocations for government communications, known jamming threats, and the frequency response of the GPS antenna used for both transmission and reception of radio signals. Because transmission occurs at a frequency other than L-band, the L-band spectrum remains allocated solely for the purpose of GPS navigation, and the unlicensed use of L-band frequencies for data communications is avoided.

The translation of data modulated code to RF for transmission is then mechanized by the addition of frequency conversion, filtering, and amplification stages. In the present invention, the conversion frequencies for converting the base band signals to non-L-band RF (and vice versa) are derived from the frequency synthesizer 206 and receiver clock 202 within the GPS receiver 14.

The integrated communications and navigation capability, as provided in the present invention, can readily be made available for many applications. This is of particular value to military uses of positioning and communications technologies. In particular, the ability to exchange a multiplicity of communications signals, without interference among the communications signals and the GPS signals, is useful, for example when a weapon controller needs to communicate with a large number of GPS guided weapons at the same time.

As one specific example of a military application, the method and system of the present invention can be used to implement two-way, half duplex communications with precision guided munitions that are equipped with GPSs to navigate to a pre-set target. The method and system of the present invention could be used to exchange communications between a weapon controller and the weapons, with minimal impact on the existing weapon electronics. The exchanged data may include, but are not limited to, re-targeting data transmitted to the weapon while in flight, target image data received from the weapon, and positioning information exchanged among members of a military unit.

In the weapon data link application discussed above, three regimes for data transmission can be identified: 1) a low data rate regime, in the range of about 1 to 10 bits/sec used to obtain health information from the weapon; 2) an intermediate data rate regime, on the order of a few hundred bits/sec to about one kilobit/sec, for changing the target coordinates; 3) a high data rate regime, on the order of one hundred to one thousand kilobits per second for transmitting images of the prospective target as seen by the weapon.

The higher data rates can be supported, as long as the received energy per bit is large enough compared to background noise plus interference. In fact, the data rate can be increased directly in proportion to the increases in the transmitter power. However, an increase in the data transmission rate entails a corresponding decrease in interference rejection. Therefore, the modem data rate can be increased from 50 bits/sec as provided in a standard GPS operation, to 1000 bits/sec or higher, by increasing the transmitter's output power, by reducing the interference rejection margin, or by a combination of the above. In order to accommodate the increased data transmission rate, a communications transceiver constructed in accordance with the present invention may provide a source of prime power for its transmitter. The selection of the interference rejection margin, as well as the selection of the transmitter's carrier frequency, can be managed in real-time over the communications channel, in order to optimize performance in the presence of the interference in the vicinity of the receiver.

With respect to the implementation of the communications transceiver, the existing GPS receiver hardware is reusable. New hardware is minimal, requiring the addition of only frequency conversion, filters, and coupling components. With the exception of software modifications and prime-power considerations for the transmitter, there are no additional requirements. One can bound the required power by considering the highest data rate transmission mode, which is 1.0 Mbps (megabytes per second) to transmit imagery data. For this bit rate, and for transmission ranges up to 200 miles the prime power for the transmitter that will ensure a signal to noise ratio of at least 12 dB per bit, with a 20 dB margin against interference is on the order of 1–10 watts. A standard lithium AA battery can be used for this purpose, or the prime power could be diverted from the thermal battery that powers other functions within a weapon or other user system.

In addition to the examples described above, military applications for the present invention may have commercial applications at locations where cell-phone or alternate means are not available, such as within mines or in regions where there is no line of sight visibility to cell phone towers.

The present invention would also have applicability to provide data communications for supporting image transmission for remotely operated equipment, in which precise positioning is also a requirement.

While the invention has been particularly shown and described with reference to specific preferred embodiments, it should be understood by those skilled in the art that various changes in form and detail may be made therein without departing from the spirit and scope of the invention. It is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

What is claimed is:

1. A method of implementing a communications transceiver using GPS (Global Positioning System) user equipment that includes a GPS transceiver connected to a conventional L-band GPS antenna, said method comprising performing a data reception function and performing a data transmission function; wherein the step of performing said data reception function comprises: (a) utilizing said conventional L-band GPS antenna to intercept at least one communications signal including an RF carrier modulated by a PN coded sequence having data modulated thereon, said RF carrier having a carrier frequency outside the L-band spectrum allocated for transmission of one or more GPS navigation signals from one or more orbiting satellites; (b) providing a downconverter between said GPS antenna and said GPS receiver for downconverting said carrier frequency of said communications signal to an RF input frequency of said GPS receiver; (c) providing an AGC (automatic gain control) circuit for controlling the amplitude of said downconverted communications signal so as to prevent interference to reception of said one or more GPS navigational signals; and (d) demodulating said down-converted communications signal to remove said PN (pseudorandom number) sequence and to detect data bits forming said data modulated thereon; and wherein the step of performing said data transmission function comprises: (e) modulating communications data onto said PN sequence, said communications data being unrelated to GPS navigational data; (f) converting said data-modulated PN sequence onto an RF (radio-frequency) carrier signal for transmission, said RF carrier signal being at a carrier frequency other than L-band frequencies that are allocated to satellite navigation for transmission.

2. A method according to claim 1, further comprising the step of amplifying said RF carrier signal, and radiating said signal from said GPS antenna.

3. A method according to claim 1, wherein the step of modulating data onto said communications signal includes the step of modifying software within said GPS transceiver so as to enable said GPS transceiver to recognize and replicate said PN sequence.

4. A method according to claim 1, wherein said data are characterized by a selectable transmission rate.

5. A method according to claim 4, wherein said selectable transmission rate is from about 1000 bits per second to about 1.0 Megabits per second.

6. A method according to claim 3, wherein said GPS transceiver includes a code generator, and wherein the step of modifying software within said GPS transceiver comprises the step of generating a communications PN code by selecting a designated initialization state of a shift register in said code generator.

7. A method according to claim 1, wherein said PN coded sequence is one of a plurality of spare PN satellite codes reserved for use other than satellites that broadcast navigation signals.

8. A method according to claim 1, wherein said GPS transceiver includes software that has been modified so as to enable said transceiver to recognize and replicate said PN code.

9. A method of receiving communications data using GPS user equipment that includes a conventional L-band GPS antenna connected to a GPS transceiver, the method comprising: (a) utilizing said GPS antenna to intercept at least one communications signal containing data modulated thereon, wherein said communications signal is characterized by a carrier frequency outside the L-band, and includes an intrinsic PN sequence encoded thereon; (b) downconverting said carrier frequency of said communications signal to an RF input frequency of said GPS receiver; (c) subjecting said downconverted communications signal to automatic gain control (AGC) so as to reduce its amplitude and prevent interference with GPS L-band signals; (d) supplying said communications signal to said GPS receiver; and (e) demodulating said communications signal to determine the data content thereof.

10. A method according to claim 9, wherein said data comprise data unrelated to GPS navigation, and wherein said data relate to at least one of: a) commands to be transmitted to one or more weapons; b) target image data from one or more weapons; c) communications and location data exchanged among members of a military unit; and d) communications and location data exchanged among civilian users.

11. A method according to claim 9, wherein the step of receiving said communications signal from said GPS antenna comprises the step of providing at least two parallel signal paths from said antenna to said GPS receiver, and wherein said parallel paths comprise a first path for L-band GPS navigational signals, and a second path for said communications signal.

12. A method according to claim 11, wherein at least one of said at least two parallel signal paths is bi-directional, so as to enable both transmission and reception of communications signals along said at least one signal path.

13. A method according to claim 9, wherein the step of demodulating said communications signal comprises the steps of: (a) de-spreading said downconverted signal by correlating said downconverted signal with a replica of said PN code generated by a receiver clock and a code generator in said GPS transceiver; and (b) determining the data content from said de-spread IF signal by correlating said IF signal with a signal generated by a frequency synthesizer in said GPS transceiver.

14. A method of transmitting data using modified GPS user equipment including a GPS transceiver connected to a GPS antenna, wherein GPS transceiver includes a receiver clock, a code generator, and a frequency synthesizer for detection and demodulation of navigational signals, and wherein said receiver clock and said code generator include software that is modified to allow recognition and replication of said PN code of said communications signal, the method comprising:

(a) modulating data from an incoming baseband data signal onto a communications signal, said communications signal containing a PN sequence encoded therein; (b) translating the data-modulated communications signal into an RF transmitter frequency for transmission on a carrier frequency outside the L-band, wherein said translation into said RF transmitter frequency uses one or more conversion frequencies generated by said receiver clock and said frequency synthesizer; and (c) amplifying said carrier signal for radiation by the GPS antenna.

15. A method according to claim 14, wherein the rate of transmission of said data is increased to at least about 1 megabits/sec.

16. A system for communicating data using GPS user equipment, said system including: (a) a common antenna for intercepting at least one communications signal, as well as L-band GPS signals; wherein said communications signal is encoded with a PN coded sequence, and wherein said communications signal has a carrier frequency outside the L-band allocated to satellite navigation; (b) a GPS transceiver; (c) a downconverter for downconverting said carrier frequency of said communications signal to an RF input frequency of said GPS transceiver; and (d) an AGC (automatic gain control) circuit for controlling the amplitude of said downconverted communications signal so as to reduce interference between said communications signal and said L-band GPS signals.

17. A system according to claim 16, wherein said GPS transceiver includes: i) means for modulating data onto said PN code, said data being unrelated to GPS navigation; and ii) means for translating said data modulated communications signal into RF for transmission.

18. A system according to claim 17, wherein said means for modulating data onto said PN code comprises: a receiver clock and a code generator within said GPS transceiver, wherein said receiver clock and said code generator include software for recognizing said PN code and generating a replica thereof.

19. A system according to claim 18, further comprising: a phase modulator for performing binary phase modulation of said data onto the carrier signal of said PN coded sequence.

20. A system according to claim 16, further comprising a band pass filter disposed between said GPS antenna and said GPS transceiver for selectively transmitting L-band signals, and rejecting signals having frequencies outside the L-band.

* * * * *

UNITED STATES PATENT AND TRADEMARK OFFICE
CERTIFICATE OF CORRECTION

| | |
|---|---|
| PATENT NO. | : 7,123,895 B2 |
| APPLICATION NO. | : 10/395941 |
| DATED | : October 17, 2006 |
| INVENTOR(S) | : Richard L. Greenspan and Joseph M Przyjemski |

It is certified that error appears in the above-identified patent and that said Letters Patent is hereby corrected as shown below:

Col. 1, line 8, after "CROSS REFERENCES TO RELATED APPLICATIONS" insert the following:

--GOVERNMENT SUPPORT

The U.S. Government has a paid up license in this invention and the right in limited circumstances to require the patent owner to license others on reasonable terms as provided for by the terms of Contract F30602-00-C-0075 (Project 68000) awarded by the Department of the Air Force, Air Force Material Command, AFRL.--

Signed and Sealed this

Tenth Day of November, 2009

David J. Kappos
*Director of the United States Patent and Trademark Office*